US009853833B2

(12) United States Patent
Brissette et al.

(10) Patent No.: US 9,853,833 B2
(45) Date of Patent: Dec. 26, 2017

(54) INDIVIDUAL VIRTUAL PRIVATE LOCAL AREA NETWORK SERVICE CONVERSION TO A DIFFERENT VIRTUAL PRIVATE NETWORK SERVICE

(71) Applicant: Cisco Technology, Inc., San Jose, CA (US)

(72) Inventors: Patrice Brissette, Gatineau (CA); Vibov Bhan, Ottawa (CA); Ali Sajassi, San Ramon, CA (US); Sami Boutros, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 15/156,093

(22) Filed: May 16, 2016

(65) Prior Publication Data

US 2017/0331720 A1    Nov. 16, 2017

(51) Int. Cl.
*H04L 12/46* (2006.01)
*H04L 12/715* (2013.01)
(Continued)

(52) U.S. Cl.
CPC ...... *H04L 12/4662* (2013.01); *H04L 12/4641* (2013.01); *H04L 12/4666* (2013.01);
(Continued)

(58) Field of Classification Search
CPC ......... H04L 45/04; H04L 45/50; H04L 45/66; H04L 45/68; H04L 45/586; H04L 49/351;
(Continued)

(56) References Cited

U.S. PATENT DOCUMENTS 9,148,290 B2    9/2015  Salam et al.
2008/0212595 A1*  9/2008  Figueira ................ H04L 12/462
                                            370/401
(Continued)

OTHER PUBLICATIONS

Sajassi et al., "(PBB-)EVPN Seamless Integration with (PBB-)VPLS," draft-ietf-bess-even-vpls-seamless-integ-00, Feb. 20, 2015, The Internet Society, Reston, VA (10 pages).
(Continued)

*Primary Examiner* — Joshua Kading
(74) *Attorney, Agent, or Firm* — The Law Office of Kirk D. Williams

(57) ABSTRACT

In one embodiment, a plurality of virtual private local area network services (VPLSs) are operated among a plurality of packet switching devices, with the plurality of VPLSs including a first VPLS and a different second VPLS. In response to a conversion declaration including a particular Service Instance VLAN ID (I-SID), the first VPLS corresponding to the particular I-SID is converted to a different type of virtual private network (VPN) service, while continuing to operate the different second VPLS which is not related to the particular I-SID. In one embodiment, the different type of VPN service is Provider Backbone Bridging Ethernet VPN (PBB-EVPN). In one embodiment, the conversion declaration is a Border Gateway Protocol (BGP) Network Layer Reachability Information (NLRI) of Route Type 3 Inclusive Multicast Ethernet Tag (IMET) route.

18 Claims, 8 Drawing Sheets

(51) Int. Cl.
  *H04L 12/721* (2013.01)
  *H04L 12/66* (2006.01)
  *H04L 12/833* (2013.01)
  *H04L 12/931* (2013.01)
  *H04L 12/723* (2013.01)
  *H04L 29/06* (2006.01)

(52) U.S. Cl.
  CPC .............. *H04L 12/66* (2013.01); *H04L 45/04* (2013.01); *H04L 45/66* (2013.01); *H04L 45/68* (2013.01); *H04L 47/31* (2013.01); *H04L 49/354* (2013.01); *H04L 69/26* (2013.01); *H04L 29/06068* (2013.01); *H04L 29/06612* (2013.01); *H04L 45/50* (2013.01)

(58) Field of Classification Search
  CPC ... H04L 49/354; H04L 49/70; H04L 49/3009; H04L 69/08; H04L 69/18; H04L 69/22; H04L 69/26; H04L 69/30; H04L 47/31; H04L 12/66; H04L 12/4641; H04L 12/4662; H04L 12/4666; H04L 12/2881; H04L 29/06612; H04L 29/06068; H04L 29/06163; H04L 2012/5617; H04L 2012/5621
  See application file for complete search history.

(56) References Cited

U.S. PATENT DOCUMENTS

| | | | |
|---|---|---|---|
| 2009/0196298 A1* | 8/2009 | Sajassi | H04L 12/4658 370/395.53 |
| 2013/0194973 A1* | 8/2013 | Farkas | G06F 8/67 370/255 |
| 2014/0204762 A1* | 7/2014 | Allan | H04L 45/12 370/238 |

OTHER PUBLICATIONS

Sajassi et al., "BGP MPLS-Based Ethernet VPN," RFC 7432, Feb. 2015, The Internet Society, Reston, VA (56 pages).
Sajassi et al., "Provider Backbone Bridging Combined with Ethernet VPN (PBB-EVPN)," RFC 7623, Sep. 2015, The Internet Society, Reston, VA (23 pages).
"Ethernet VPN (EVPN) and Provider Backbone Bridging-EVPN: Next Generation Solutions for MPLS-based Ethernet Services: Introduction and Application Note," May 2014, Cisco Systems, Inc., San Jose, CA (10 pages).

* cited by examiner

INDIVIDUAL VIRTUAL PRIVATE LOCAL AREA NETWORK SERVICE CONVERSION TO A DIFFERENT VIRTUAL PRIVATE NETWORK SERVICE

TECHNICAL FIELD

The present disclosure relates generally to packet switching network communications, including, but not limited to, provider virtual private network bridging services and technology.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

A Virtual Private LAN Service (VPLS) is typically built with a full-mesh of Ethernet pseudowires among Multiprotocol Label Switching (MPLS) Provider Edge (PE) routers that are part of a given layer-2 broadcast domain. A VPLS PE emulates an Ethernet bridge by performing data-plane MAC learning against traffic arriving over the pseudowires and local interfaces. Provider Backbone Bridging (e.g., IEEE 802.1ah) defines a hierarchy of bridging devices that includes provisions to scale up the number of services that can be multiplexed into a single Backbone VLAN.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
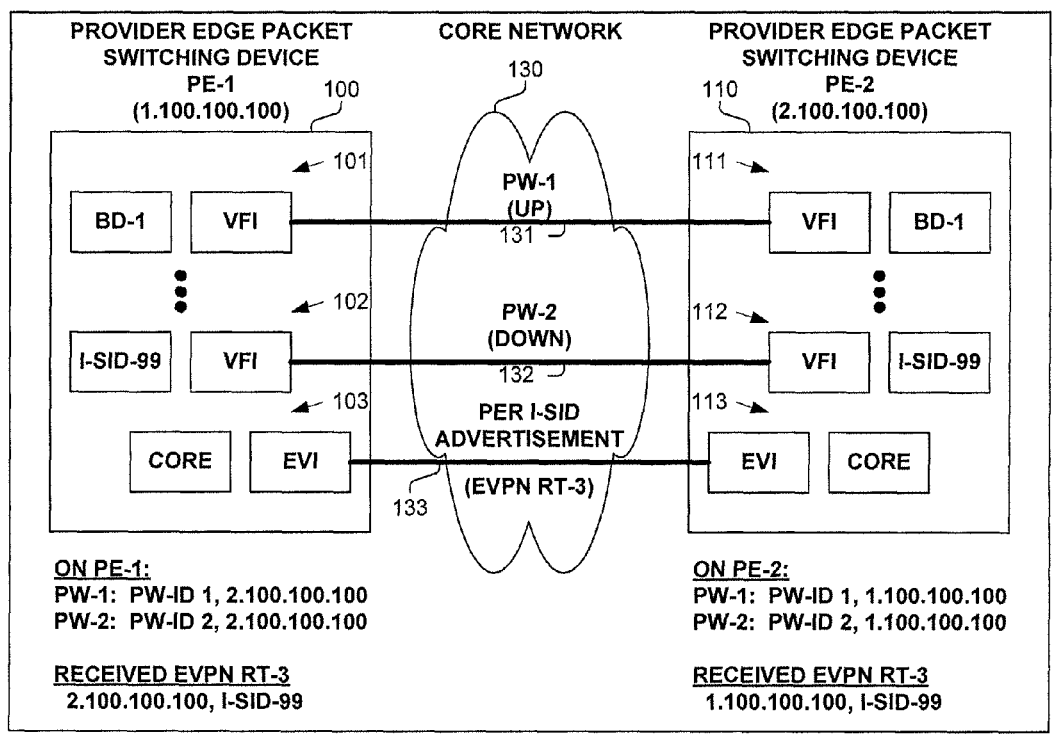
FIG. 1A illustrates a network operating according to one embodiment.

Disclosed are, inter alia, methods, apparatus, computer-storage media, mechanisms, and means associated with individual Virtual Private Local Area Network Service (VPLS) conversion to a different Virtual Private Network Service (VPLS).

One embodiment includes a method comprising: operating a plurality of virtual private local area network services (VPLSs) among a plurality of packet switching devices, with the plurality of VPLSs including a first VPLS and a different second VPLS; and in response to a conversion declaration including a particular Service Instance VLAN ID (I-SID) while said operating the plurality of VPLSs, converting the first VPLS corresponding to the particular I-SID to a different type of virtual private network (VPN) service and operating the different type of VPN service related to the particular I-SID, while continuing to operate the different second VPLS which is not related to the particular I-SID.

In one embodiment, the different type of VPN service is Provider Backbone Bridging Ethernet VPN (PBB-EVPN). In one embodiment, the conversion declaration is a Border Gateway Protocol (BGP) Network Layer Reachability Information (NLRI) of Route Type 3 Inclusive Multicast Ethernet Tag (IMET) route. One embodiment performs PBB-EVPN seamless integration with VPLS using service containment.

In one embodiment, said operating the plurality of VPLSs among the plurality of packet switching devices includes communicating packets among a plurality of different bridge domains (BDs) over a plurality of pseudowires (PWs), with the plurality of different BDs including a first BD of the first VPLS on a first plurality of packet switching devices of the plurality of packet switching devices and a second BD of the different second VPLS on a second plurality of packet switching devices of the plurality of packet switching devices. In one embodiment, said converting the particular VPLS includes ceasing communicating packets over one or more PWs among the first BD on each of the first plurality of packet switching devices while continuing to communicate packets over one or more PWs among the second BD on each of the second plurality of packet switching devices.

2. Example Embodiments

Disclosed are, inter alia, methods, apparatus, computer-storage media, mechanisms, and means associated with individual Virtual Private Local Area Network Service (VPLS) conversion to a different Virtual Private Network Service (VPLS). Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

FIG. 1A illustrates a network operating according to one embodiment. Each of FIGS. 1A-C use same reference numbers to refer to same elements of one embodiment. Shown in FIG. 1A are provider edge packet switching devices PE-1 (100) and PE-2 (110) communicatively coupled via core network 130. Shown are virtual private network (VPN) services 101/111 and 102/112.

Initially, both VPN services 101/111 and 102/112 were virtual private local area network services (VPLSs) with bridge domains 101/111 and 102/112 respectively communicatively coupled over pseudowire-1 (PW-1) 131 and pseudowire-2 (PW-2) 132. Note that the term "bridge domain" is used interchangeably in industry with the term "broadcast domain." Shown at the bottom of FIG. 1A are the configuration information for PW-1 (131) and PW-2 (132) on PE-1 (100) and PE-2 (110), respectively.

As shown in FIG. 1A, VPLS 102/112 has been converted to a different VPN service, which in this embodiment is Provider Backbone Bridging Ethernet VPN (PBB-EVPN) using Core and EVPN Instance (EVI) 103/113 on PE-1 (100) and PE-2 (110), respectively communicatively coupled together via core network 130 as illustrated by connection(s) 133.

In one embodiment, a conversion declaration is a Border Gateway Protocol (BGP) Network Layer Reachability Information (NLRI) of Route Type 3 Inclusive Multicast Ethernet Tag (IMET) route. Shown at the bottom of FIG. 1A are the NLRI Route Type 3 IMET on PE-1 (100) and PE-2 (110), respectively. As shown, the Route Type 3 IMET includes a particular Service Instance VLAN ID (I-SID) allowing for VPN conversions on a per-I-SID basis for neighbors in a VPN-ID context. Prior systems could not distinguish between conversion requests for individual I-SIDs, so all pseudowires between provider edge packet switching devices in the VPN-ID context were required to be brought down to avoid multicast and looping issues. As shown in FIG. 1A, PW-2 (132) is operationally down. In contrast PW-1 (131) is operationally up still providing VPLS for bridge domain 101/111. PBB-EVPN service is provided for bridge domain 102/112.

Figure 1B:
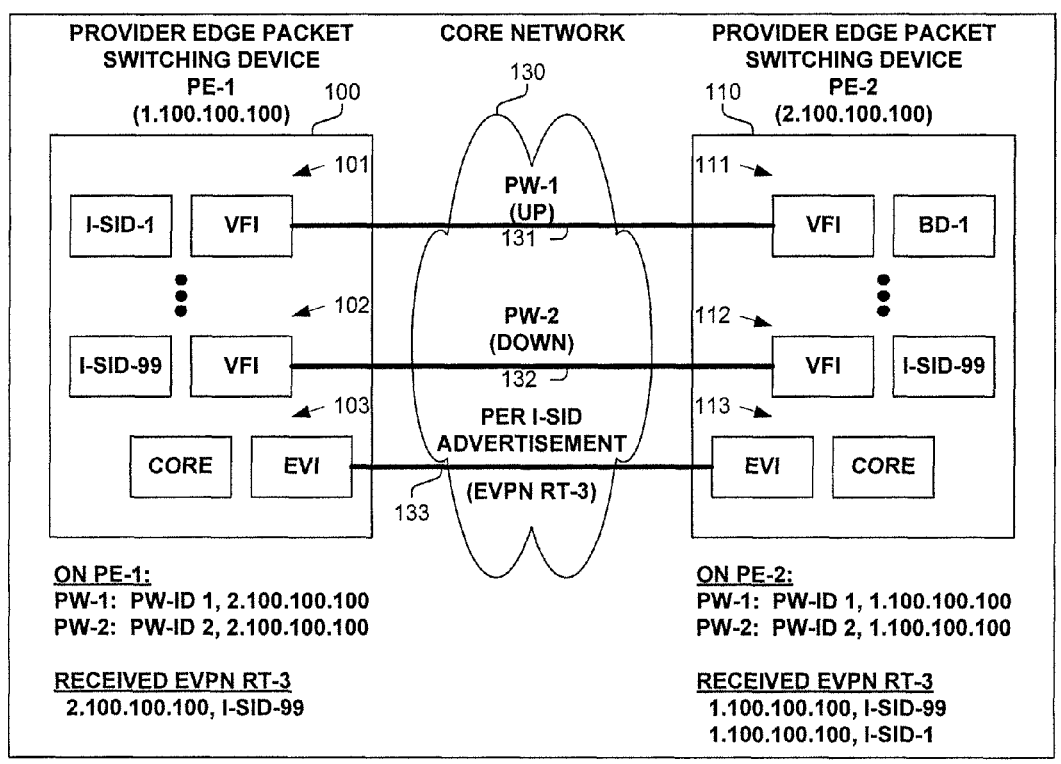
FIG. 1B illustrates a network operating according to one embodiment.

Next, as shown in FIG. 1B, bridge domain 101/111 is being converted to PBB-EVPN with changes in PE-1 100 that I-SID-1 is connected to core/EVI 103 and communicates a convert declaration for 1.100.100.100, I-SID-1 to PE-2 113 as shown in the bottom right-hand portion of FIG. 1B. PW-1 (131) remains in the up operational state providing connectivity for bridge domain 101/111 as the portion thereof on PE-2 (110) has not been converted to providing PBB-EVPN.

Figure 1C:
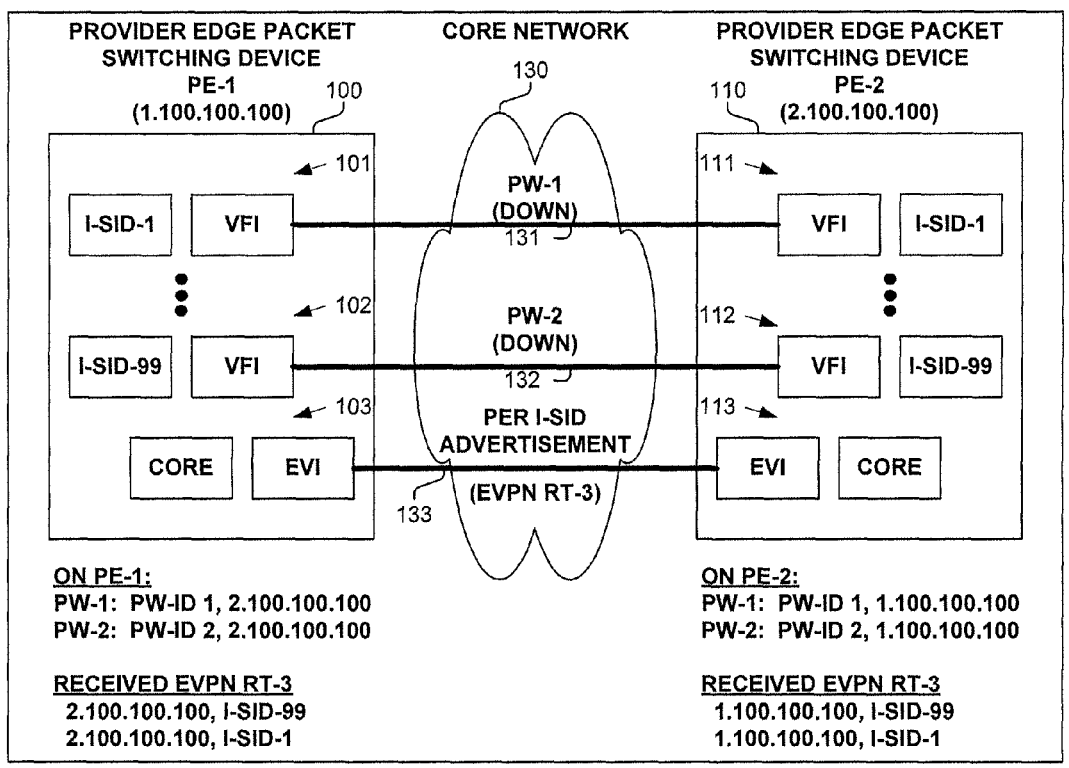
FIG. 1C illustrates a network operating according to one embodiment.

As shown in FIG. 1C, the portion of bridge domain 101/111 on PE-2 (110) has been converted to providing PBB-EVPN (as illustrated by I-SID-1 of 111) is connected to core/EVI 113 and communicates a convert declaration for 2.100.100.100, I-SID-1 to PE-1 103 as shown in the bottom left-hand portion of FIG. 1C. Both bridge domains 101/111 and 102/112 are now operating according to PBB-EVPN, and both PW-1 (131) and PW-2 (132) are operationally down.

In one embodiment, the process illustrated in FIG. 1A, 1B then 1C is performed in reverse order to convert from PBB-EVPN to VPLS.

Figure 2A:
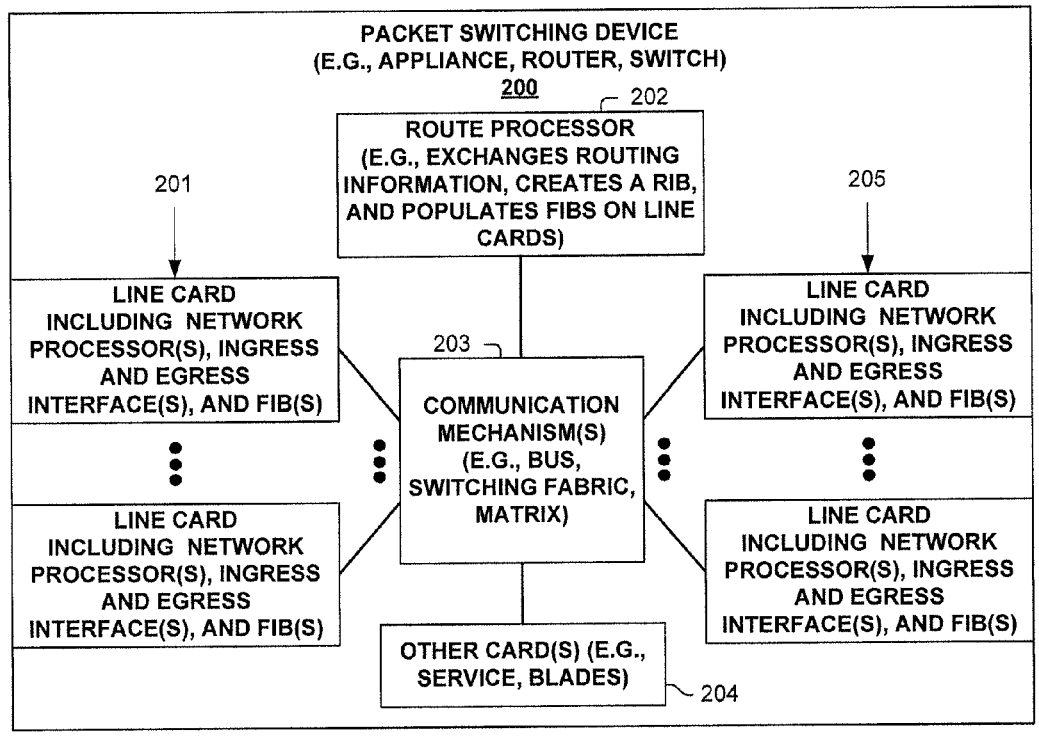
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with individual Virtual Private Local Area Network Service (VPLS) conversion to a different Virtual Private Network Service (VPLS). Packet switching device 200 also has a control plane with one or more processing elements 202 for managing the control plane and/or control plane processing of packets associated with individual Virtual Private Local Area Network Service (VPLS) conversion to a different Virtual Private Network Service (VPLS). Packet switching device 200 also includes other cards 204 (e.g., service cards, blades) which include processing elements that are used in one embodiment to process packets associated with individual Virtual Private Local Area Network Service (VPLS) conversion to a different Virtual Private Network Service (VPLS), and some communication mechanism 203 (e.g., bus, switching fabric, matrix) for allowing its different entities 201, 202, 204 and 205 to communicate. In one embodiment, route processor 202 and/or line card(s) 201 perform lookup operations in a mapping database.

Line cards 201 and 205 typically perform the actions of being both an ingress and egress line card, in regards to multiple other particular packets and/or packet streams being received by, or sent from, packet switching device 200. In one embodiment, line cards 201 and/or 205 perform packet processing operations, including, but not limited to, determining how to ingress and/or egress process packets. Even though the term FIB includes the word "forwarding," this information base typically includes other information describing how to process corresponding packets.

Figure 2B:
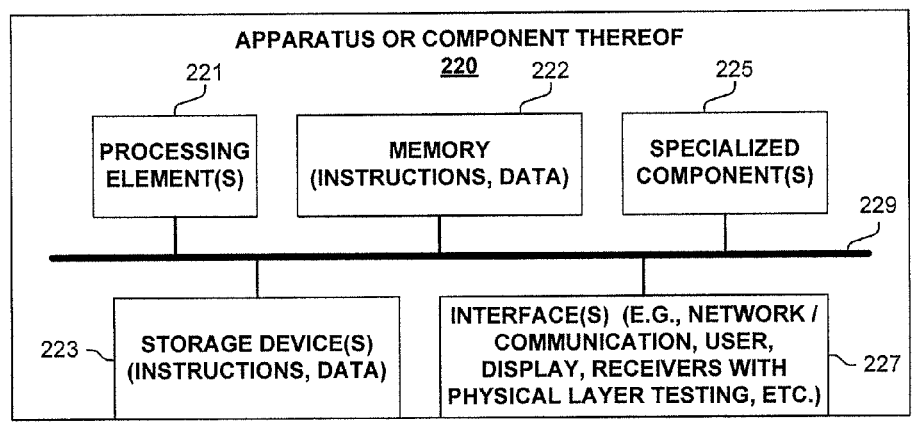
FIG. 2B illustrates an apparatus or component thereof according to one embodiment.

FIG. 2B is a block diagram of an apparatus 220 used in one embodiment associated with individual Virtual Private Local Area Network Service (VPLS) conversion to a different Virtual Private Network Service (VPNS). In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221 (typically with on-chip memory), memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3:
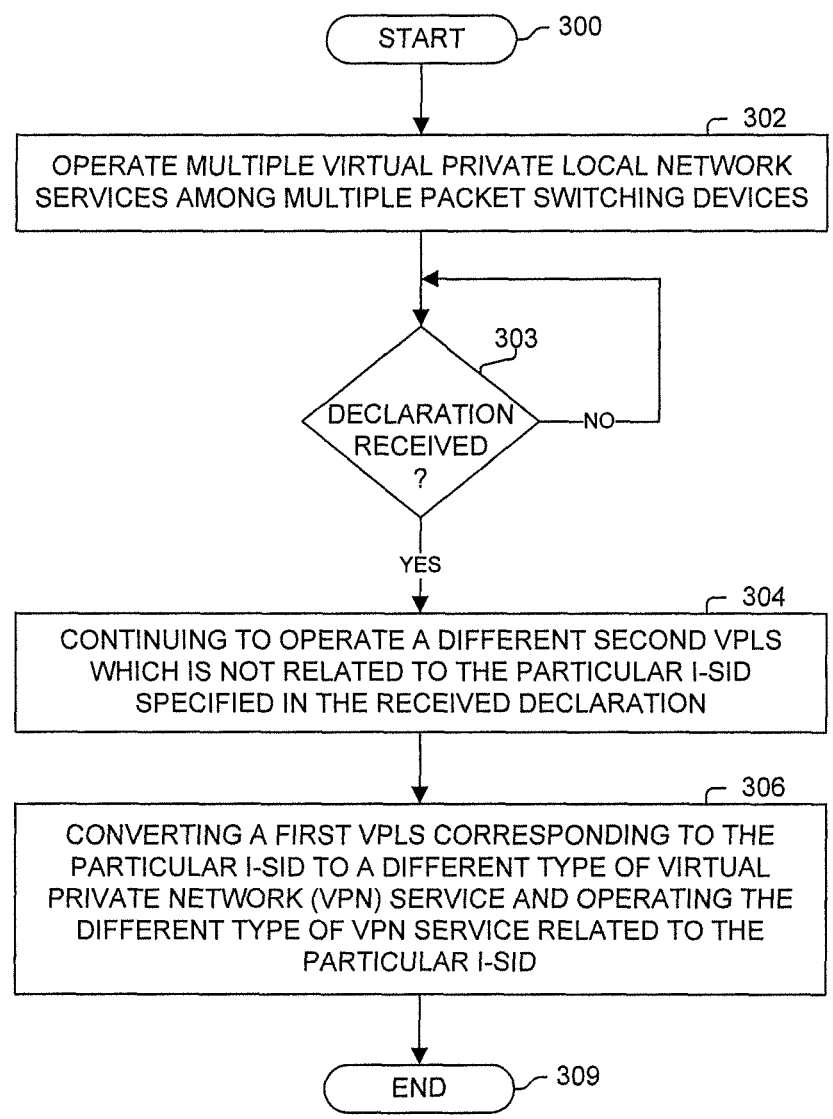
FIG. 3 illustrates a process according to one embodiment.

FIG. 3 illustrates a process according to one embodiment. Processing begins with process block 300. In process block 302, multiple VPLS are operated among multiple packet switching devices. As determined in process block 303, if a conversion declaration specifying a particular I-SID has been received by one or both packet switching devices for a bridge domain of neighboring pairs of packet switching devices over a pseudowire, then processing proceeds to process block 304, else processing returns to process block 303. In one embodiment, processing proceeds to process block 304 only if the conversion declaration has been received by both packet switching devices. In one embodiment, processing proceeds to process block 304 upon a first conversion declaration being received by either one of the packet switching devices.

In process block 304, the second VPLS which is not related to the particular I-SID continues to operate as normal, including using its associated pseudowire. In process block 306, a first VPLS corresponding to the particular I-SID is converted to a different type of VPN service, which is used to communicatively couple the packet switching devices of the bridge domain. Processing of the flow diagram of FIG. 3 is complete as indicated by process block 309. One embodiment repeats the processing of process blocks 303-306 to convert one or more VPLSs.

Figure 4:
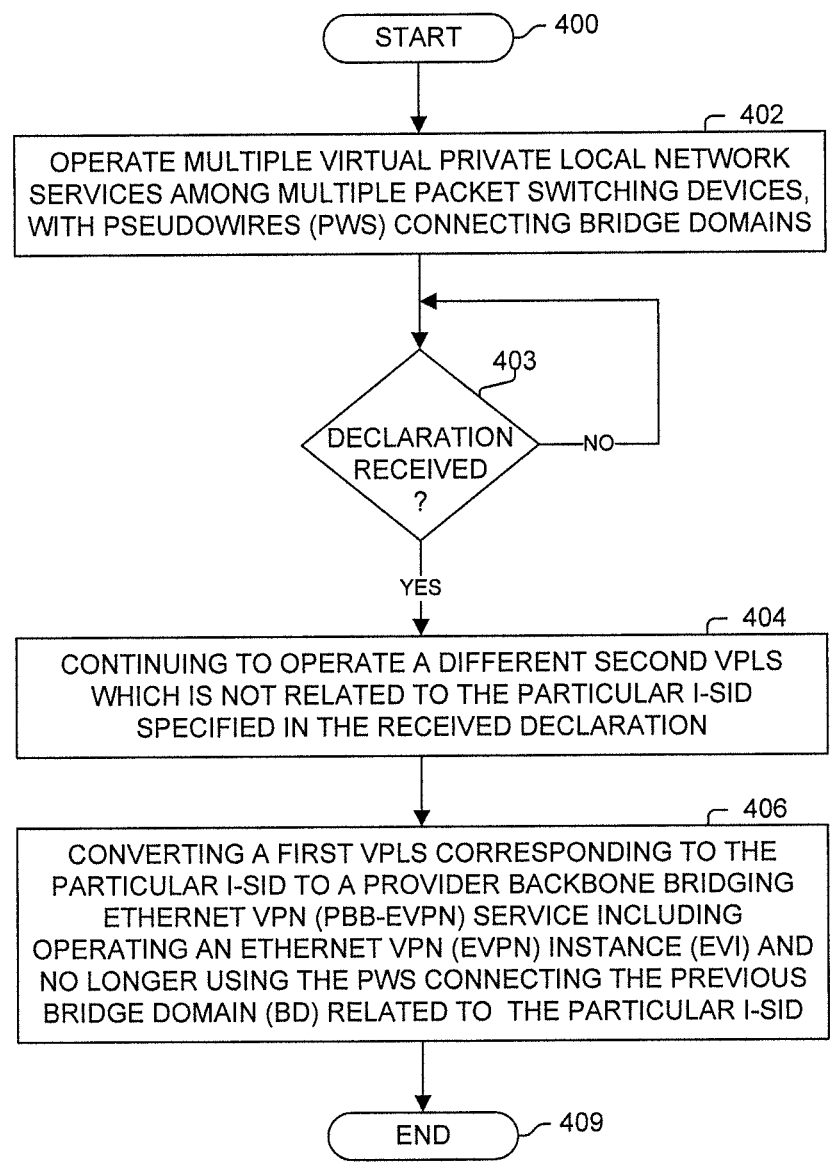
FIG. 4 illustrates a process according to one embodiment.

FIG. 4 illustrates a process according to one embodiment. Processing begins with process block 400. In process block 402, multiple VPLS are operated among multiple packet switching devices using pseudowires to communicatively couple instances of a same bridging domain on different packet switching devices.

As determined in process block 403, if a conversion declaration specifying a particular I-SID has been received by one or both packet switching devices for a bridge domain of neighboring pairs of packet switching devices over a pseudowire, then processing proceeds to process block 404, else processing returns to process block 403. In one embodiment, processing proceeds to process block 404 only if the conversion declaration has been received by both packet switching devices. In one embodiment, processing proceeds to process block 404 upon a first conversion declaration being received by either one of the packet switching devices.

In process block 404, the second VPLS which is not related to the particular I-SID continues to operate as normal, including using its associated pseudowire.

In process block 406, a first VPLS corresponding to the particular I-SID is converted to PBB-EVPN service, which is used to communicatively couple the packet switching devices of the bridge domain, with the pseudowire previously used for bridging put in an operational down state or removed.

Processing of the flow diagram of FIG. 4 is complete as indicated by process block 409. One embodiment repeats the processing of process blocks 403-406 to convert one or more VPLSs.

Figure 5:
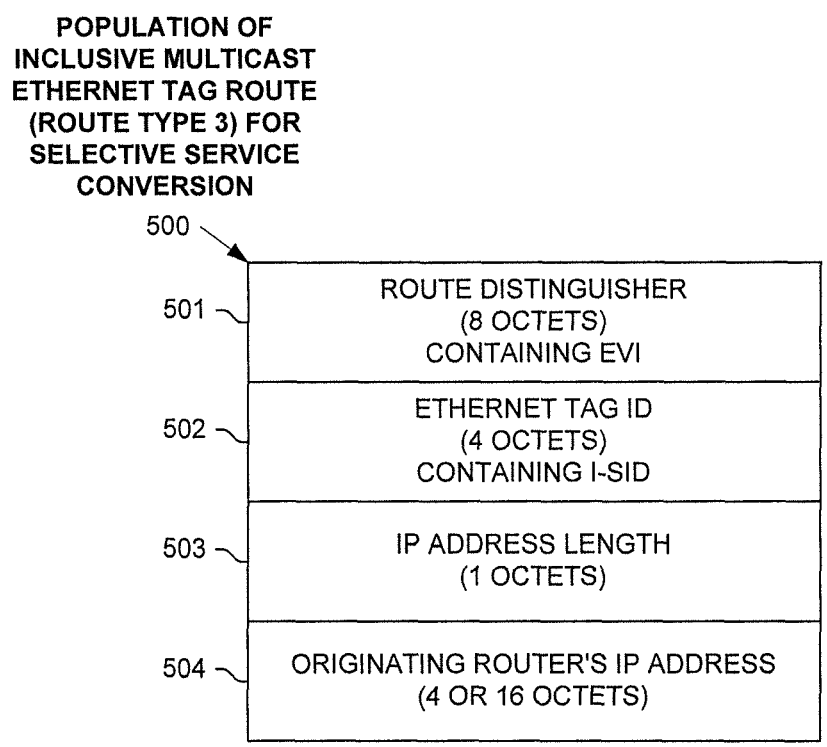
FIG. 5 illustrates fields of a conversion declaration according to one embodiment.

FIG. 5 illustrates fields 500 of a conversion declaration according to one embodiment. In one embodiment, fields 500 are according to an Inclusive Border Gateway Protocol (BGP) Network Layer Reachability Information (NLRI) of Route Type 3 Inclusive Multicast Ethernet Tag (IMET) route. In one embodiment, fields 500 include: a Route Distinguisher field 501 populated with a corresponding EVI; an Ethernet Tag ID field 502 populated with the I-SID; an Internet Protocol (IP) Length field 503 specifying IPv4 or IPv6; and an Originating Router's IP address field 504 specifying the corresponding IPv4 or IPv6 address.

Figure 6:
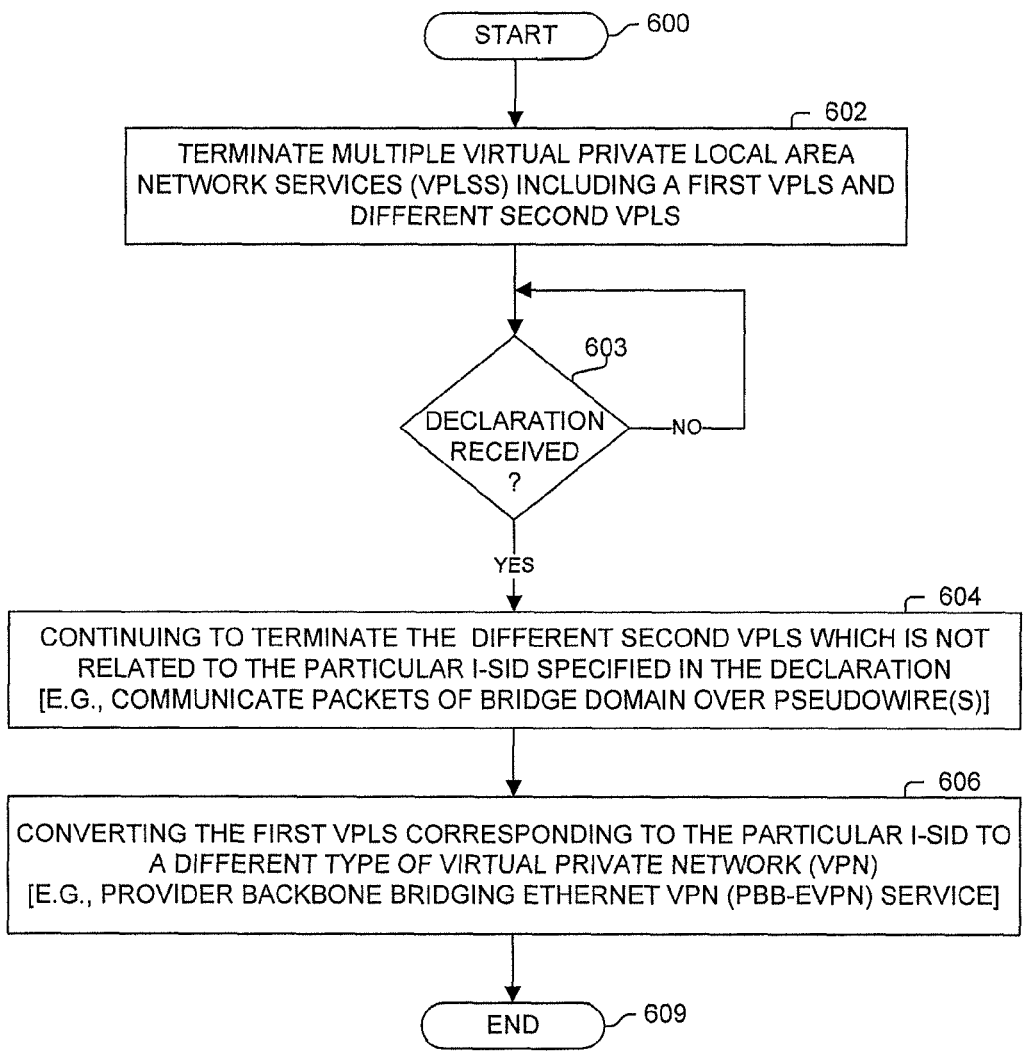
FIG. 6 illustrates a process according to one embodiment.

FIG. 6 illustrates a process performed by a packet switching device (e.g., a provider edge packet switching device) according to one embodiment. Processing begins with process block 600. In process block 602, the packet switching device terminates multiple VPLS services, including a first VPLS and a different second VPLS. As used herein, "terminating" a VPLS service signifies an endpoint of a VPLS service and includes operating the VPLS service for a bridge domain such as by, but not limited to, communicating over one or more pseudowires with one or more other packet switching devices.

As determined in process block 603, if a conversion declaration specifying a particular I-SID has been received by the packet switching device, then processing proceeds to process block 604, else processing returns to process block 603. In one embodiment, processing proceeds to process block 604 only if, or until, a conversion declaration has been also been sent by the packet switching device to the sender of the received conversion declaration.

In process block 604, the second VPLS which is not related to the particular I-SID continues to operate as normal, including using its associated pseudowire.

In process block 606, a first VPLS corresponding to the particular I-SID is converted to PBB-EVPN service, which is used to communicatively couple the packet switching devices of the bridge domain, with the pseudowire previously used for bridging put in an operational down state or removed.

Processing of the flow diagram of FIG. 6 is complete as indicated by process block 609. One embodiment repeats the processing of process blocks 603-606 to convert one or more VPLSs.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method comprising:
    operating a plurality of virtual private local area network services (VPLSs) among a plurality of packet switching devices, with the plurality of VPLSs including a first VPLS and a different second VPLS; and
    in response to a conversion declaration including a particular Service Instance VLAN ID (I-SID) while said operating the plurality of VPLSs, converting the first VPLS corresponding to the particular I-SID to a different type of virtual private network (VPN) service and operating the different type of VPN service related to the particular I-SID, while continuing to operate the different second VPLS which is not related to the particular I-SID.

2. The method of claim 1, wherein the different type of VPN service is Provider Backbone Bridging Ethernet VPN (PBB-EVPN).

3. The method of claim 2, wherein the conversion declaration is a Border Gateway Protocol (BGP) Network Layer Reachability Information (NLRI) of Route Type 3 Inclusive Multicast Ethernet Tag (IMET) route.

4. The method of claim 3, wherein the particular I-SID is included in the Ethernet Tag ID field of the IMET.

5. The method of claim 1, wherein the conversion declaration is a Border Gateway Protocol (BGP) Network Layer Reachability Information (NLRI) of Route Type 3 Inclusive Multicast Ethernet Tag (IMET) route.

6. The method of claim 5, wherein said operating the plurality of VPLSs among the plurality of packet switching devices includes communicating packets among a plurality of different bridge domains (BDs) including a first BD of the first VPLS on a first plurality of packet switching devices of the plurality of packet switching devices; and
    wherein said converting the particular VPLS includes operating an Ethernet VPN (EVPN) instance (EVI) corresponding to the particular I-SID on each of the first plurality of packet switching devices.

7. The method of claim 5, wherein said operating the plurality of VPLSs among the plurality of packet switching devices includes communicating packets among a plurality of different bridge domains (BDs) over a plurality of pseudowires (PWs), with the plurality of different BDs including a first BD of the first VPLS on a first plurality of packet switching devices of the plurality of packet switching devices; and
    wherein said converting the particular VPLS includes operating an Ethernet VPN (EVPN) instance (EVI) corresponding to the particular I-SID on each of the first plurality of packet switching devices, and ceasing communicating packets over PWs among the first BD on each of the first plurality of packet switching devices.

8. The method of claim 1, wherein said operating the plurality of VPLSs among the plurality of packet switching devices includes communicating packets among a plurality of different bridge domains (BDs) over a plurality of pseudowires (PWs), with the plurality of different BDs including a first BD of the first VPLS on a first plurality of packet switching devices of the plurality of packet switching devices and a second BD of the different second VPLS on a second plurality of packet switching devices of the plurality of packet switching devices; and
    wherein said converting the particular VPLS includes ceasing communicating packets over one or more PWs among the first BD on each of the first plurality of packet switching devices while continuing to communicate packets over one or more PWs among the second BD on each of the second plurality of packet switching devices.

9. The method of claim 8, wherein the different type of VPN service is Provider Backbone Bridging Ethernet VPN (PBB-EVPN).

10. The method of claim 9, wherein the conversion declaration is a Border Gateway Protocol (BGP) Network Layer Reachability Information (NLRI) of Route Type 3 Inclusive Multicast Ethernet Tag (IMET) route.

11. The method of claim 1, comprising: in response to a second conversion declaration including a second particular I-SID while said continuing to operate the different second VPLS which is not related to the particular I-SID, converting the different second VPLS corresponding to the second particular I-SID to the different type of virtual private network (VPN) service.

12. The method of claim 1, wherein each of the plurality of packet switching devices is a provider edge packet switching device.

13. A method, comprising:
    terminating a plurality of virtual private local area network services (VPLSs) by a particular provider edge packet switching device, with the plurality of VPLSs including a first VPLS and a different second VPLS; and
    in response to receiving a conversion declaration including a particular Service Instance VLAN ID (I-SID) while said terminating the plurality of VPLSs, the particular provider edge packet switching device converting the first VPLS corresponding to the particular I-SID to a different type of virtual private network (VPN) service and terminating the different type of VPN service related to the particular I-SID, while continuing to terminate the different second VPLS which is not related to the particular I-SID.

14. The method of claim 13, wherein the different type of VPN service is Provider Backbone Bridging Ethernet VPN (PBB-EVPN).

15. The method of claim 14, wherein the conversion declaration is a Border Gateway Protocol (BGP) Network Layer Reachability Information (NLRI) of Route Type 3 Inclusive Multicast Ethernet Tag (IMET) route.

16. The method of claim 13, wherein said continuing to terminate the different second VPLS includes communicating packets over one or more pseudowires (PWs) with one or more packet switching devices of a bridge domain (BD) of the different second VPLS.

17. A packet switching device, comprising:
one or more processing elements;
a memory;
a plurality of interfaces configured to send and receive packets; and
one or more packet switching mechanisms configured to packet switch packets among said interfaces;
wherein the packet switching device is configured to perform operations including:
terminating a plurality of virtual private local area network services (VPLSs), with the plurality of VPLSs including a first VPLS and a different second VPLS; and
in response to receiving a conversion declaration including a particular Service Instance VLAN ID (I-SID) while said terminating the plurality of VPLSs, converting the first VPLS corresponding to the particular I-SID to a different type of virtual private network (VPN) service and terminating the different type of VPN service related to the particular I-SID, while continuing to terminate the different second VPLS which is not related to the particular I-SID.

18. The packet switching device of claim 17, wherein the different type of VPN service is Provider Backbone Bridging Ethernet VPN (PBB-EVPN); and wherein the conversion declaration is a Border Gateway Protocol (BGP) Network Layer Reachability Information (NLRI) of Route Type 3 Inclusive Multicast Ethernet Tag (IMET) route.

\* \* \* \* \*